Figure 1:
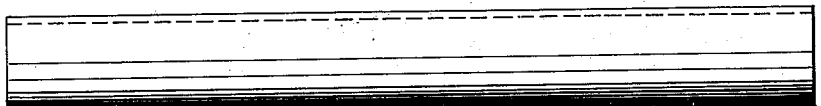

Oct. 18, 1949.         R. MAYNE ET AL         2,485,534
          METHOD OF MAKING SPAR ROOTS FOR HELICOPTER
                    BLADES AND THE LIKE
                     Filed Dec. 27, 1946

Inventors
Robert Mayne &
Harry L. Hosterman, Jr.

By A. H. Oldham
       Attorney

Patented Oct. 18, 1949

2,485,534

UNITED STATES PATENT OFFICE 2,485,534

METHOD OF MAKING SPAR ROOTS FOR HELICOPTER BLADES AND THE LIKE

Robert Mayne, Akron, and Harry L. Hosterman, Jr., Atwater, Ohio, assignors to Goodyear Aircraft Corporation, Akron, Ohio, a corporation of Delaware Application December 27, 1946, Serial No. 718,696

8 Claims. (Cl. 29—156.8)

This invention relates to methods of manufacture and forming hollow metal bodies and, more particularly, is concerned with methods of making spar roots for helicopter blades and the like.

In the copending patent application, Serial No. 713,157 filed November 29, 1946, and entitled "Airfoils, and particularly helicopter blades," is illustrated a helicopter blade construction for which spar roots, according to the invention, are employed. This helicopter blade, made of sheet metal, including a hollow spar of substantially square cross-sectional shape, was designed with the view to obtain a rugged construction of relatively light weight and minimum deformation under all flight conditions. This construction required a correspondingly strong and light-weight spar root snugly fitting into the slightly tapered end of a spar to form therewith a well proportioned unit.

In order to make such a spar root, having the desired physical properties, a novel method has been developed to obtain a product with least waste of material and labor. This is accomplished by using tubular stock material, preferably of chrome-molybdenum steel, which has to pass through several processes. The tube employed usually has a wall thickness somewhat greater than the greatest thickness of the finished spar root and, then, a portion of its length is reduced by swaging in one or a series of steps depending on the degree of taper and wall thickness of the tube, to smaller diameters decreasing towards the end with simultaneously increasing the wall thicknesses which will permit a smooth inside and outside machine finish of the tube to the desired thickness and longitudinal shape. After machining, the circumferential dimensions and thicknesses of the tube will correspond to those of the finished spar root, except that the cylindrical portion is left substantially uniform in thickness and is provided adjacent its end with an outside shoulder, to be explained later on. Furthermore, the wall of the tapered tube portion is gradually reduced in thickness towards its small end to avoid abrupt change in wall thickness when assembled with the blade spar into which it is to be fitted, in order to prevent concentrated stresses therein.

For forming the tube, a mandrel, provided with a pilot, preferably made of cast iron, and substantially conforming to inside dimensions of the tapered portion of the finished spar root and to the inner diameter of the cylindrical portion of the machined tube is now inserted into the tube and is forced in as far as possible. The pilot of the mandrel is made so long that its front end will just pass through the small end of the tube. Preferably rolling means under adequate pressure are then applied to progressively flatten the round tube against the flat sides of the mandrel. Thereby, the tube will expand opposite the corners of the mandrel which, then, can be forced farther into the tube for further flattening it. This process is repeated until the inside of the tube has substantially assumed the shape of the mandrel. Thereupon, the tube is removed and cut off at both ends to its finished length, after which operation an attachment fitting, preferably made of the same material as the tube, is secured by copper-brazing, or equivalent fastening means, to the cylindrical end of the tube, followed by a heat-treating process of this assembly. The final operation consists in tapering the outer wall of the fitting towards the tube and the inner wall of the tube adjacent the fitting towards the fitting, so that both pieces gradually merge into each other to prevent concentrated stresses in this assembly.

It is the general object of the invention to employ a practical, economical and efficient process for making a one-piece hollow metal root for spars of helicopter blades, and the like, out of round tubular stock, and to form a longitudinal portion of this stock into a taper having a cross-sectional shape different from round.

Another object of the invention is to make in a simple way from a piece of round metal tube a one-piece hollow root having a tapered portion insertable in a spar of a helicopter blade, and the like, and to transform the round tapered portion machined to specified thickness into a taper having a cross-sectional shape different from round, but unchanged circumferential dimensions.

The aforesaid objects of the invention, and other objects will be apparent as the description proceeds.

Figure 2:
Figure 3:
Figure 4:
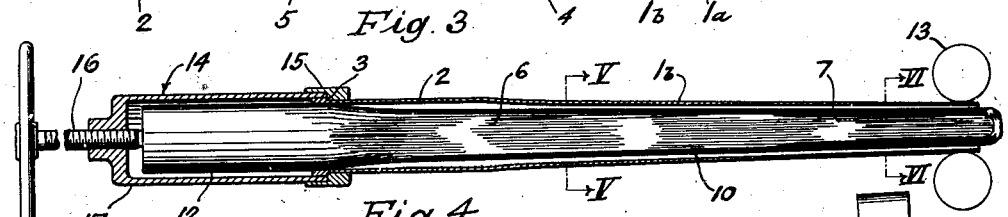
Figure 10:
Figure 5:
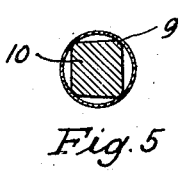
Figure 6:
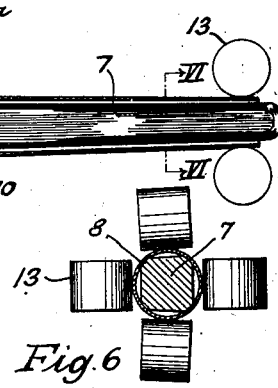
Figure 7:
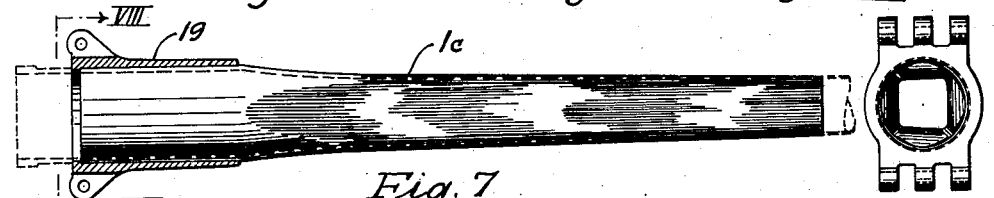
Figure 8:
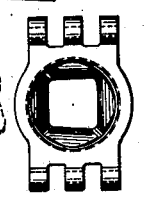
Figure 9:
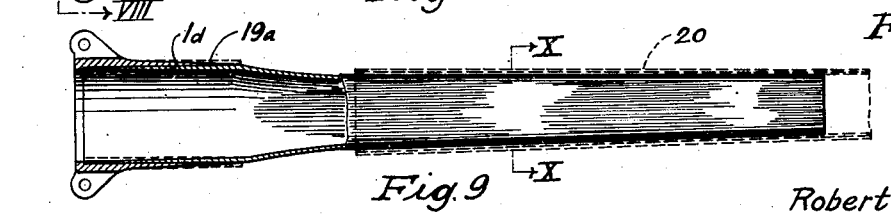

For a better understanding of the invention reference should be had to the accompanying drawing, wherein Fig. 1 is a longitudinal view of a round, tubular blank from which a spar root is to be formed according to the invention, Fig. 2 is a similar view showing the blank swaged down for a portion of its length to smaller diameters, Fig. 3 is a longitudinal sectional view showing the work piece machined inside and outside to finished dimensions, Fig. 4 illustrates the forming process of the work piece from a round to a substantial square cross sectional shape, Fig. 5 is a cross-sectional view taken on line V—V of Fig. 4, Fig. 6 is a cross-sectional view taken on line VI—VI of Fig. 4, Fig. 7 is a longitudinal side view of the spar root cut to finished length and an attachment fitting united therewith, Fig. 8 is an end view taken on line VIII—VIII of Fig. 7, Fig. 9 is a longitudinal side view, shown partly in section, of the fully completed spar root shown in connection with a helicopter blade indicated fragmentarily in dotted lines, Fig. 10 is a cross-sectional view taken on line X—X of Fig. 9.

Although the principles of the invention are broadly applicable for aircraft airfoils they are especially employed for helicopter blade spar roots and hence it has been so illustrated and will be so described.

With specific reference to the form of the invention illustrated in the drawings, the numeral 1 indicates a suitable length of tube stock, preferably made of chrome-molybdenum steel, from which the spar root is to be formed according to the invention. The first step in forming this tube into a tapered spar root is to gradually reduce by swaging action a longitudinal portion of the tube stock to smaller diameters, whereby the wall thickness of the swaged portion will increase and simultaneously stretching of the work piece will take place to assume the form of 1a. The wall thickness of the original tube stock shall, by example, be about 3/8 of an inch, which due to swaging action will increase the more the smaller the diameter will become. Thus, sufficient material is piled up as to make it possible to smoothly machine the wall of the swaged tube inside and outside to diameters conforming to the circumference of the finished spar root. The machined tube 1b includes a cylindrical portion 2 having a shoulder 3, a straight tapered portion 4 and a slightly curved tapered portion 5 connecting the portions 2 and 4. The tube wall thickness is kept greatest where the portions 2 and 5 join and thins out towards the small end of the straight taper 4. The next step, shown in Fig. 4, consists in inserting a mandrel 6, conforming to the inside shape of the tapered portion of the finished spar root, into the tube 1b. The mandrel, provided with a pilot 7, is shoved clear through the tube until the cut-off corners 8 of the pilot contact the tube walls, and the rounded corners 9 of the tapered portion 10 within the spar root finished length, are also about touching the tube wall, whereas the cylindrical portion 12 of the mandrel is guided in the cylindrical portion 2 of the tube. Pressure is now applied against the tube, preferably by rolls 13 movable therealong opposite the flat surfaces of the mandrel 6, whereby the tube portions being in contact with the mandrel wall are pushed outwardly away therefrom. Thus the mandrel will have more room and can be forced farther into the tube by means of a pressure device 14 resting with its abutment 15 against the shoulder 3 of the tube, and with its spindle 16, being screwed into a housing 17 by a hand wheel 18, against the mandrel. These forming operations are repeated until the tube substantially fits over the mandrel 6. It is to be noted that the flattening of the taper is performed only by the pressure rolls which bend the tube from a round cross-section into a substantially square cross-section without, however, changing its circumferential dimensions.

After this forming operation, the tube is cut to finished length of 1c, as shown in Fig. 7, and an end fitting 19 for attaching the spar root to a helicopter drive is copper brazed to the cylindrical tube portion. Following this procedure, the spar root assembly is heat-treated according to standard practice, which consists in heating it to about 1650° F., that is, below brazing temperature, quenching and then tempering it at about 950° F. Finally, the tube 1c, adjacent the fitting, and the fitting 19 are tapered down to substantially zero thickness, taking the forms 1d and 19a, respectively, as illustrated in Fig. 9, thus one part gradually merging with the other to prevent undesired stress concentrations in the spar root. This last process makes the spar root ready for assembly with a helicopter blade 20, best shown in Fig. 10.

It will be recognized that the objects of the invention have been achieved by the above described process which permits economical manufacture of a light and strong spar root having a substantially square cross section where it fits into the spar of a helicopter blade, and the like, and which requires a minimum of material and labor.

While in accordance with the Patents Statutes one best known embodiment of the invention has been illustrated and described in detail, it is to be particularly understood that the invention is not limited thereto or thereby, but that the inventive scope is defined in the appended claims.

What we claim is:

1. That method of making a hollow root for a helicopter blade spar, having a longitudinally tapered portion of substantially square cross section, including the steps of taking a suitable length of steel tube stock, swaging said tube towards one end to longitudinally spaced smaller diameters, machining the swaged tube inside and outside to diameters conforming to the circumference of the final cross-sectional shapes of said spar root and leaving a shoulder at the unswaged end of said tube, inserting a mandrel, conforming to the inside shape of said finished spar root and provided with a pilot extension, into said tube for flattening the tapered portion thereof against the flat sides of said mandrel whereby the tube wall, originally in contact with the corners of said mandrel, will be made to clear these corners, forcing the mandrel farther into the tube as far as it now will permit and repeating the flattening process until the inside of the tube has substantially assumed the shape of the mandrel, cutting off the formed tube at both ends to the finished length, copper-brazing an attachment fitting of the same material as the tube to the large end thereof, heat treating this assembly at a temperature lower than the brazing temperature, quenching the assembly, tempering the assembly, and finally tapering the inner wall of said tube adjacent the fitting and the outer wall of the fitting at opposite ends from their full thickness to substantially zero thickness to prevent stress concentration between the tube and fitting.

2. That method of making for a helicopter blade spar a hollow root having a longitudinally tapered portion of substantially square cross-section, including the steps of swaging a metal tube of suitable dimensions for a portion of its length down to progressively smaller diameters, machining the swaged tube to straight line tapers inside and outside to a wall thickness corresponding to that of the end product, inserting a mandrel of substantially square cross-section and shaped to the inside of the finished root into said tube, and forming the tube by laterally pressing the round tapered section of the tube against the flats of the mandrel to conform the tube to the shape of the mandrel without stretching or shrinking the tube, and cutting off said tube at both ends to its final length.

3. That method of making for a helicopter blade a hollow spar root, having a longitudinal cylindrical portion and a longitudinal tapered portion, said tapered portion having a cross-sectional shape different from round, including the steps of swaging a longitudinal portion of a piece of a round metal tube towards one end to smaller diameters, machining the swaged tube outside and inside on substantially straight line tapers to diameters defining the finished thicknesses of the final product, but leaving a shoulder at the large end of the tube for applying pressure means, inserting a mandrel, having substantially the inside contours of the product and being provided with a pilot extension, into said tube so that the pilot reaches substantially to the end of the tube and contacts the walls thereof at least along two lines with clearances therebetween, applying transverse pressure against the tube between said lines against the mandrel to spread the tube at the contacting lines, forcing the mandrel farther into the tube until new contact is being made between tube and mandrel, repeating these processes until the tube has assumed the shape of the mandrel, and cutting off the tube at both ends to the finished length.

4. That method of making for a helicopter blade a hollow spar root, having a longitudinal cylindrical portion and a longitudinal tapered portion, said tapered portion having a cross-sectional shape different from round, including the steps of swaging a longitudinal portion of a piece of a round metal tube towards one end to smaller diameters, machining the swaged tube outside and inside on substantially straight line tapers to diameters defining the finished thicknesses of the final product, but leaving a shoulder at the large end of the tube for applying pressure means, inserting a mandrel, having substantially the inside contours of the product and being provided with a pilot extension, into said tube so that the pilot reaches substantially to the end of the tube and contacts the walls thereof at least along two lines with clearances therebetween, applying transverse pressure against the tube between said lines against the mandrel to spread the tube at the contacting lines, forcing the mandrel farther into the tube until new contact is being made between tube and mandrel, repeating these processes until the tube has assumed the shape of the mandrel, and cutting off the tube at both ends to the finished length, brazing an attachment fitting to the round end of the tube, heat-treating this assembly below that of the brazing temperature, quenching the assembly, tempering the assembly, and finally tapering the inside wall of the tube adjacent said fitting and the outside wall of the fitting in opposite directions from their greatest thickness to substantially zero thickness.

5. That method of making for a helicopter blade a hollow spar root having a longitudinal cylindrical and a tapered portion, said tapered portion being of substantially polygonal cross-section, including the steps of swaging a portion of a metal tube of suitable dimensions down to progressively smaller diameters, machining the swaged tube inside and outside to tapered wall thicknesses which, except for the cylindrical portion of the tube, define the wall thicknesses of the finished spar root, the wall thicknesses of the tapered portion decreasing from a maximum at the larger end to a minimum at the smaller end, applying transverse pressure against the round cross sections of the machined tapered portion of the tube, and forming the said cross-sections into a polygonal cross-section without changing the circumferences thereof, and cutting off the tube at both ends to its finished length.

6. That method of making for a helicopter blade a hollow spar root having a longitudinal cylindrical and a tapered portion, said tapered portion being of substantially polygonal cross-section, including the steps of swaging a portion of a metal tube of suitable dimensions down to progressively smaller diameters, machining the swaged tube inside and outside to diameters which, except for the cylindrical portion of the tube, define the wall thicknesses of the finished spar root, the wall thicknesses of the tapered portion decreasing from a maximum at the larger end to a minimum at the smaller end, applying transverse pressure against the round cross sections of the machined tapered portion of the tube, and forming the said cross-sections into a polygonal cross-section without changing the circumferences thereof, and cutting off the tube at both ends to its finished length, uniting an attachment fitting by molten metal with the cylindrical end of said tube to uniformally and securely connect their overlying surfaces with each other, and tapering in opposite direction the inside of the tube and the outside of the fitting from the largest thickness to substantially zero thickness towards their respective ends to prevent concentrated stresses in this assembly.

7. That method of making in one piece a hollow metal root for a hollow helicopter blade spar having a longitudinal tapered portion of substantially square cross section into which said root is to fit, including the steps of taking a suitable length of round tube stock, swaging to stepped down diameters, in at least one operation, the portion of the tube length to be tapered, machining the swaged round tube portion on substantially straight tapers outside and inside to diameters defining substantially the thicknesses of at least the tapered portion of the finished root, inserting a mandrel conforming to the inside shape of the tapered portion of the finished root and being provided with a pilot, into said tube, thereby longitudinally substantially contacting with its edges the wall of said tube, forcing the wall portions of the tube between said contacts against the opposite flat portions of the mandrel whereby said contacting portions are moved away from the mandrel, pushing the mandrel farther into the tube until contact is reestablished; repeating these operations until the tube has substantially assumed the shape of the mandrel, and cutting off the tube at both ends to its finished length.

8. That method of making for a helicopter blade spar a hollow root of metal having a longitudinal cylindrical portion and a longitudinal tapered portion, said tapered portion having a cross-sectional shape different from that of the cylindrical portion, including the steps of taking a suitable length of round tube stock having appropriate wall thickness, swaging the tube portion to be tapered in stages to progressively smaller diameters, machining the swaged tube at least in the tapered portion outside and inside to diameters defining the thicknesses of the finished root, inserting a mandrel of polygonal shape in section and formed to the inside of the finished root, bringing the mandrel at its greatest widths into circumferentially-spaced line contacts with the tube wall, applying pressure against the tube between said longitudinal line contacts of the tube and the mandrel to conform the tube to the shape of the mandrel and to release the contacting portions of the tube from the mandrel, moving the mandrel farther into the tube until the greatest widths of the tapered portion thereof are again in contact with the tube wall, repeating the pressure-applying and mandrel-moving steps until the tube has assumed substantially the shape of the mandrel, and cutting off the tube at both ends to the finished length.

ROBERT MAYNE.
HARRY L. HOSTERMAN, Jr.

REFERENCES CITED

The following references are of record in the file of this patent:

UNITED STATES PATENTS

| Number | Name | Date |
|---|---|---|
| 1,890,077 | Elting | Dec. 6, 1932 |
| 1,891,904 | Barnhart | Dec. 27, 1932 |
| 1,982,874 | Jamison | Dec. 4, 1934 |
| 2,037,636 | Lagerblade | Apr. 14, 1936 |
| 2,200,506 | Kline | May 14, 1940 |
| 2,272,439 | Stanley et al. | Feb. 10, 1942 |

FOREIGN PATENTS

| Number | Country | Date |
|---|---|---|
| 705,691 | France | Mar. 16, 1931 |